Feb. 14, 1933.   H. J. MILLER   1,897,067
SIDE DUMP TRUCK
Filed May 31, 1930   2 Sheets-Sheet 1
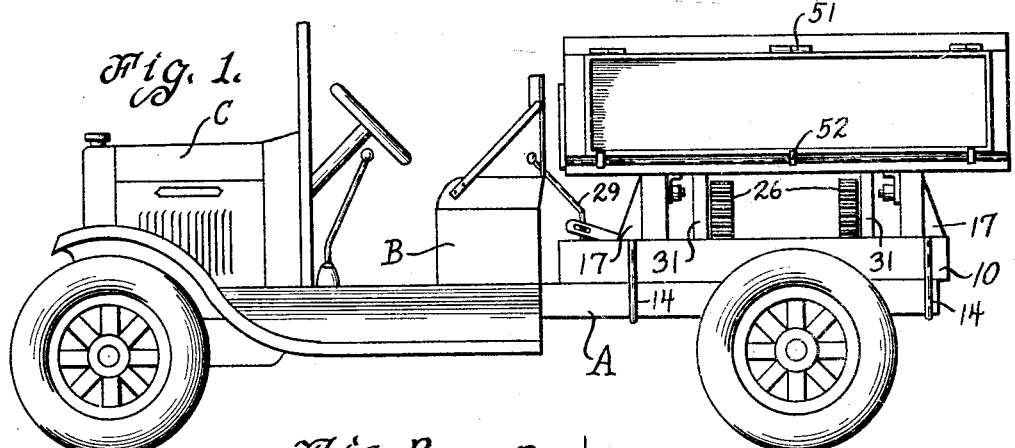
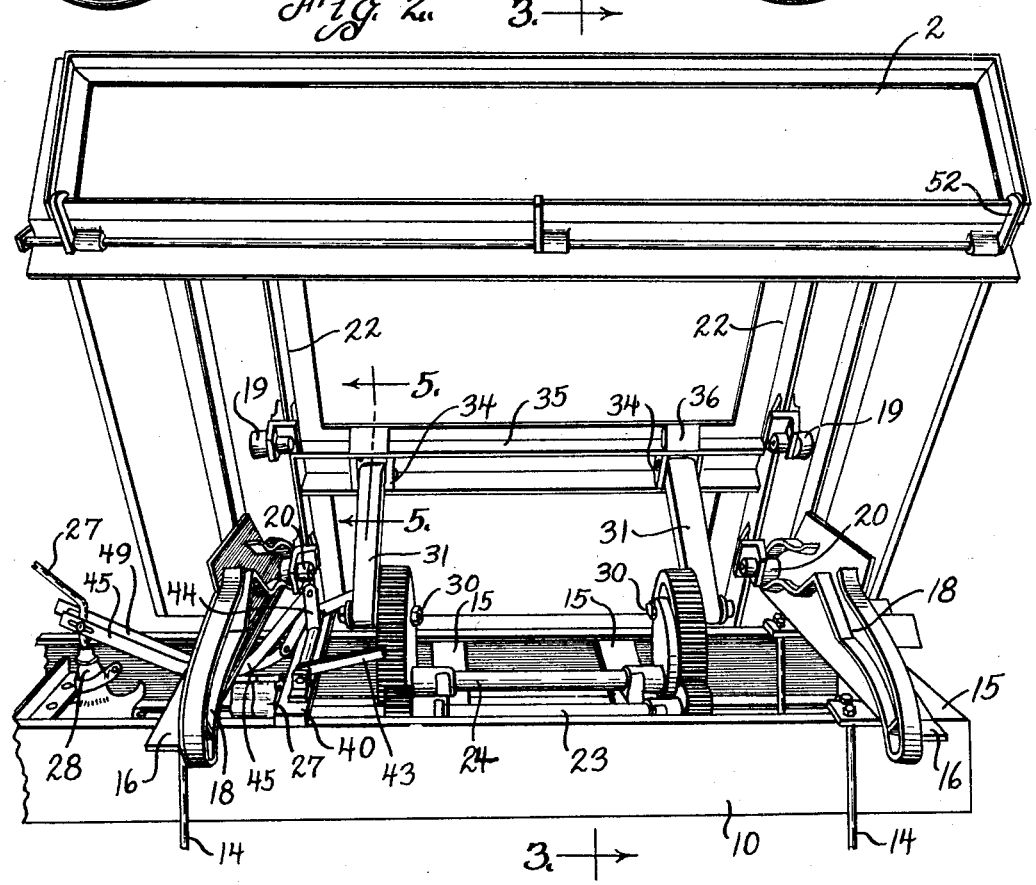
INVENTOR.
Harvey J. Miller
BY
ATTORNEY.

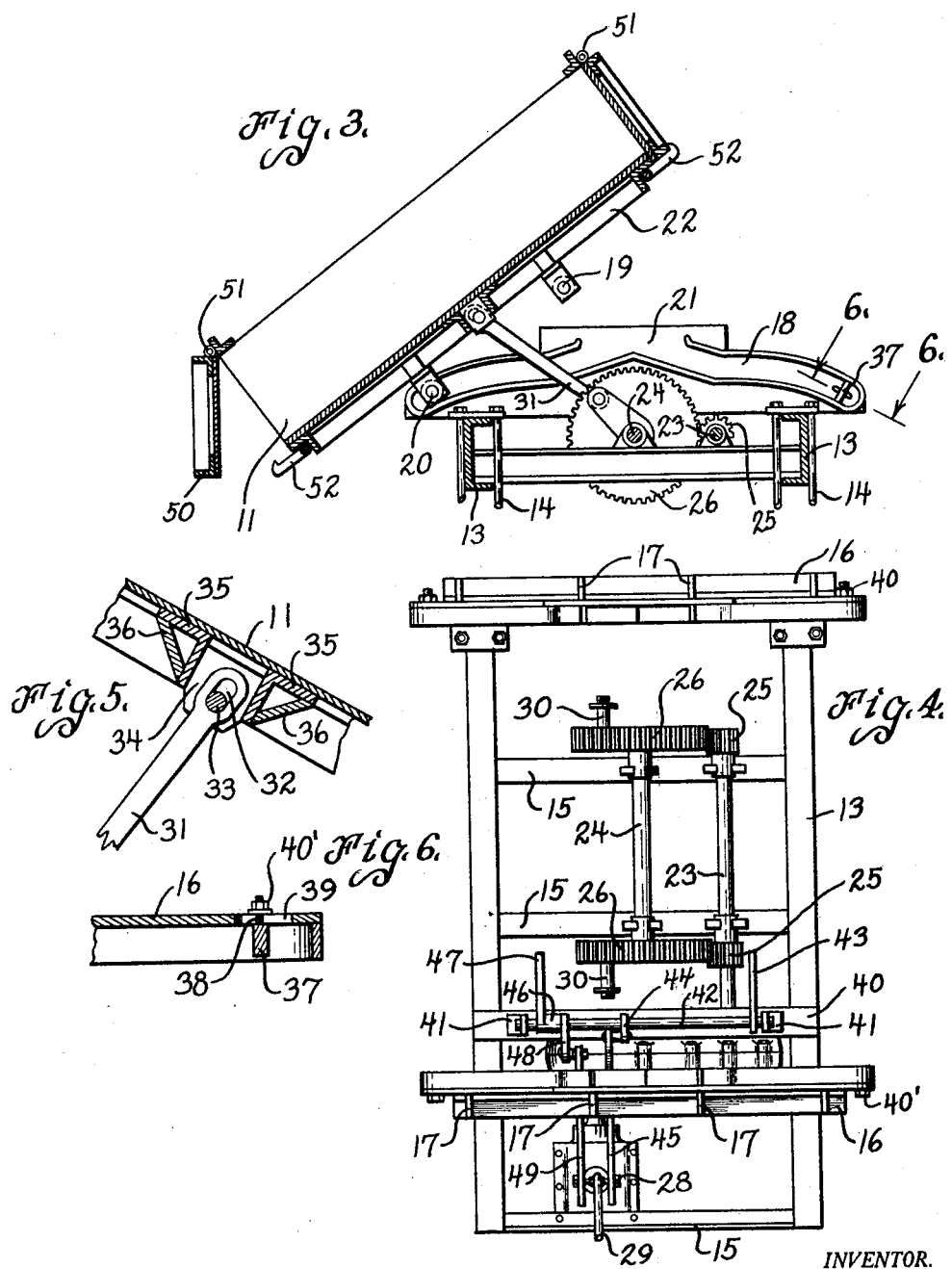

Patented Feb. 14, 1933

1,897,067

UNITED STATES PATENT OFFICE

HARVEY J. MILLER, OF NILES CENTER, ILLINOIS, ASSIGNOR TO ARCOLE CONSTRUCTION CO., OF NILES CENTER, ILLINOIS, A CORPORATION OF ILLINOIS

SIDE DUMP TRUCK

Application filed May 31, 1930. Serial No. 458,036.

This invention relates to a motor driven dump truck or the like, and especially relates to an improved construction of side dump truck adapted for hauling sand, gravel or similar material, and provided with improved means for discharging the load at either side.

The main object of the invention is to provide a side dump truck of the character described having improved means for tilting the body laterally in reverse directions at such angles as will cause the automatic discharge of the material through the openings in the body when the corresponding closure is opened.

Another object of the invention is the construction of a dump truck of the character described, having improved means for tilting the body to either side, as occasion may require, said body being adapted to slide sidewise in being tilted so that its contents will be dumped at a point distant from the wheels of the vehicle, the mechanism for raising, moving and tilting the body sidewise being of a simple and rugged construction.

A further object of this invention is to provide a dump truck of the character described, adapted for discharging the load to either side, said body being raised, tilted and moved sidewise by improved mechanism constructed along lines convenient for low cost production, sturdiness in operation and highly efficient for carrying out the purposes for which it is designed.

A still further object of the invention is to provide a side dump truck of the character described, having improved means for raising, sliding and tilting the body to discharge the contents thereof to either side, said means comprising suitable gears for driving the same, link members connected with said gears and body adapted for raising and tilting the body, and transversely disposed tracks upon which the body is adapted to ride in its sliding and tilting movement.

A still further object of the invention is to provide in a side dump truck of the character described, an improved means for adjusting the angle to which the body may be tilted for discharging the load.

A still further object of the invention is to provide in a side dump truck of the character described, improved means for tilting the body to dump the load, said means being connected with the motor of the vehicle for actuating the same, and means for automatically disconnecting the last mentioned means from the motor when the body has reached its predetermined discharging position.

A still further object of the invention is to provide an improved mechanism in a side dump truck for discharging the load at either side, said mechanism comprising a gear train for driving the same, and a plurality of links connecting said gear train with said body, adapted for raising, tilting and sliding said body to move the same to its discharging position, said links having one end thereof pivotally connected to said gears, and the other end thereof slideably and pivotally connected to said body whereby the initial movement of the gear will cause the links to move off dead center, and further movement of said gear will cause the raising, tilting and sliding of the body in the desired direction.

With the foregoing and other objects in view, which will appear as the description proceeds, the invention consists in certain novel and improved features of construction, arrangement and combination of parts hereinafter more fully described, illustrated in the accompanying drawings, and particularly pointed out in the appended claims, it being understood that various changes in the form, size and minor details of the construction may be made without departing from the spirit or sacrificing any of the advantages of the invention.

For the purpose of facilitating an understanding of my invention, I have illustrated in the accompanying drawings, a preferred embodiment thereof, from an inspection of which, when considered in connection with the following description, its mode of construction and assembly, and many of its advantages should be readily understood and appreciated.

Referring to the drawings in which similar characters of reference are employed to indicate corresponding or similar parts throughout the several figures of the drawings:

Figure 1 is a view in side elevation of a side dump truck constructed in accordance with the principles of my invention.

Figure 2 is a side view of the same, showing the body in tilted position for load discharging purposes.

Figure 3 is a transverse sectional view taken on line 3—3 of Figure 2.

Figure 4 is a plan view of the chassis of the truck showing the tilting mechanism with the body removed.

Figure 5 is a sectional view of a detail taken on line 5—5 of Figure 2; and

Figure 6 is a sectional view of a detail taken on line 6—6 of Figure 3.

Referring to the drawings more specifically by characters of reference, the letter A designates generally a frame of any suitable construction of chassis which may be of a standard make or special form, and upon which the device is adapted to be mounted, said device being disposed as shown, preferably in the rear of the driver's seat B of a motor vehicle driven by the usual form of gas engine disposed under the hood C. Obviously the said device may be mounted upon any suitable form of trailer or its equivalent.

In general, the device comprises a main supporting frame designated by the character 10, a dump box 11 and suitable means for tilting the box laterally in opposite directions, and for holding it in its various positions of adjustment.

As illustrated more clearly in the drawings, the main frame 10 comprises a pair of lengthwise sills or channel bars 13 arranged in transversely spaced parallel relation and in the same horizontal plane lengthwise of the axis and supported on the chassis frame A, to which it may be rigidly secured in any suitable manner, such for example as by the clamping bolts 14.

Suitably disposed cross bars 15, which may be of any desired shape or construction such for example as angle irons, channel bars or the like, are secured in any suitable and wellknown manner to the sills 13 near their front and rear ends as well as intermediate their ends, said cross bars being positioned in longitudinally spaced relation lengthwise on said sills and preferably at right angles thereto so as to form a rigid part of the main frame 10, and thereby to hold the sills in fixed spaced relation. The cross bars 15 are adapted not only for holding the sills in said fixed relation, but also for assisting in forming a uniform and sturdy supporting frame for the dump box and its operating mechanism, as will be hereinafter more fully described.

Disposed on the frame 10 and rigidly secured in any suitable manner to the upper faces of the sill 13 are a pair of cross members 16, which members may be of angular formation as shown in the drawings, and suitably braced by integrally formed bracing portions 17 to provide a rigid and sturdy support. Both of said cross members 16 extend laterally beyond and preferably equal distances from the outer faces of the sills and are therefor of substantially uniform length corresponding approximately to the width of the box 11, the cross bars being disposed so that their horizontal flanges will face outwardly, providing a substantially uninterrupted inner vertical face plate to which may be rigidly secured, in any suitable manner, such for example as by welding or the like, a suitably curved track 18, adapted to cooperate with suitable rollers 19 and 20, to be presently described, provided on the under side of the box for guiding said box in its vertical tilting movement, and also for holding the box against lengthwise displacement relative to the main supporting frame.

The tracks 18 are substantially similar in shape and configuration on each side of their center, and form a substantially closed loop with the exception of a space 21 at the upper central portion thereof for permitting the escape of either the roller 19 or 20 as the box is being tilted to one side or the other. It will be noted that the rollers 19 and 20 will be disposed within their respective loops when the box is in its normal horizontal position, and said rollers will ride therein during the first portion of the tilting movement, but as soon as the space 21 is reached by the roller which is on the side away from that to which the load is being discharged said roller will move suddenly upward permitting the ready tilting of the box. The rollers 19 and 20 are rigidly secured in any wellknown manner, such as by welding or the like, to angle bars 22 rigidly secured to the under side of the box, said angle bars being disposed transversely on the box and also aid in reinforcing the said box. The rollers are disposed at any suitable point along the length of said angle bars, preferably a distance equal to about one-third of the width of the boxing from each side thereof.

The tilting mechanism will now be described in detail, said mechanism being clearly shown in Figure 4 of the drawings. On a pair of the longitudinally spaced cross bars or braces 15, which are rigidly secured to the sills 13 intermediate the ends of said sills, is supported a pair of longitudinally spaced, substantially parallel shafts 23 and 24, and rigidly mounted on said shafts for rotation therewith, are the gears 25 and 26 respectively, said gears being in constant mesh with each other. The gears just described form a portion of the gear train for transmitting rotary motion from the operating shaft 23 to the shaft 24; the gear train may be of any speed-reducing or power-multiplying type to enable the operation of the shaft 23 to easily tilt the box with the load therein for dumping purposes, and also to restore the box to its normal horizontal position, in a manner hereinafter more fully described.

In the embodiment illustrated, the shaft 23 extends beyond the gear 25 thereon, the end of said shaft being connected in any suitable and wellknown manner with a train of gears (not shown) disposed in a suitable box or container 27 positioned and secured on the chassis A. The train of gears is connected up in the wellknown and usual manner with a suitable transmission system disposed in the gear box 28, said gear box 28 being disposed immediately in the rear and adjacent to the driver's seat B, to be in position for convenient operation by the driver of the vehicle. Obviously, the power needed for driving the tilting mechanism may be taken from the engine of the vehicle, or the shaft 23 may be hand operated by connecting the same with a suitable crank arm. As any suitable motor driven or manual operated means may be employed for actuating the operating shaft 23, it is thought not necessary to describe the said driving mechanism or the gear train in more detail. The usual gear shifting lever 29 is employed for controlling the operation of the shaft 23 when the latter is motor driven, as shown in the drawings.

Pivotally secured in any suitable manner, such for example as by the studs 30, to each of the gears 26 is a suitably constructed link member 31, said link member having the lower end thereof pivoted to the gear at a point away from the center to give the desired cam action for tilting the box. The other end of each of the said link members is provided with a relatively elongated slot 32 within which is received a stud or pin 33, the ends of which stud are journalled in a suitable bracket 34, which bracket is rigidly secured, such for example as by welding or the like, to the underside of the box, and to a pair of longitudinally disposed brace bars 35. Suitable brace plates 36 are provided against the brackets 34 for strengthening the construction at that point.

When the box 11 is in its normal horizontal position it will be noted that the link members 31 will be substantially in a vertical position, and when in such position they will exert a downward pull on the box substantially locking the same thereby preventing any tilting movement of the box or any vertical vibration thereof. When it is desired to tilt the box to one side or the other, the rotation of the shaft 23 in the desired direction will cause a corresponding rotation of the gears 26. The initial movement of the gears 26 will cause the upper end of the link members 31 to slide a distance equal to the length of the slot 32 on the pin 33, at the completion of which sliding movement it will begin to act against the box 11 through its connection with the brackets 34 and pins 33. It will thus be noted that by providing the pin and slot connections 33 and 32 there will be an initial movement of the link members in the desired direction before actual movement of the box is begun, thereby obviating the danger of the said link members assuming a dead center position and thus locking themselves in such position.

In order to limit the angle at which the load is to be dumped, I provide adjacent each closed end of the loops of the tracks 18, an adjustable stop plate 37, shown more clearly in Figures 3 and 6 of the drawings. The plate 37 has provided thereon a bolt 38 which extends through an elongated slot 39 provided in the member 16, the said bolt 38 having a nut 40 threaded thereon, which nut may be tightened to lock the plate in the slot 39 in any desired adjusted position. It will thus be noted that by adjusting the plate member 37 along the tracks 18, the angle to which the box will be tilted before dumping the load may be varied.

In order to stop the operation of the shaft 23 when the box has reached its fully tilted position, the following means are provided:

On a cross rod 40, rigidly secured to the upper surfaces of the sills 13, are provided a pair of spaced brackets 41, within which are journaled the ends of the shaft or rod 42. Adjacent one end of said shaft 42 is secured to said shaft an arm 43 which is disposed in position to be engaged by the link member 31 when the box is brought to its fully tilted position to cause a rotation of said shaft 42. A second arm 44 is also rigidly secured to said shaft intermediate its ends, the free end of said second arm being pivotally secured to one end of a link member 45, the other end of which link member is connected to the lever 29 controlling the operation of the gear train. Mounted on the shaft 42, adjacent the other end thereof, is a sleeve 46, having an arm 47 formed integral therewith, and positioned so as to be engaged by the link member 31 when the box has reached its fully tilted position at the other side. The sleeve 46 is provided with a second arm 48, the free end of which is pivotally secured to one end of a link member 49, the other end of which link member is connected with the gear lever 29. Thus, when the box has reached its fully tilted position, the link member 31 will engage either the arm 43 or 47, depending on what side the load is being dumped, for stopping the rotation of the shaft 23.

Suitable side gates 50 are provided for the box 11. Said gates are adapted to be suitably locked by any suitable locking members such for example as the ones shown at 52, and hinged at the top as at 51, whereby the load may be readily discharged when desired.

It will be seen that I have provided a novel and improved form of side dump truck which may be easily and conveniently operated by either power driven or manual means. Also, that a simplified construction has been provided which is adapted to dump the load at either side, and which will hold the box in a substantially locked condition while in its normal horizontal position. In addition, I have also provided a mechanism which is composed of few and simple parts which are readily accessible for repair and replacement, and which will effectively carry out the purposes for which it is designed.

It is believed that my invention, its mode of construction and assembly, and many of its advantages should be readily understood and appreciated from the foregoing without further description, and it will be manifest that while a preferred embodiment of the invention has been shown and described for illustrative purposes, the structural details are, nevertheless, capable of wide variation within the purview of my invention as defined in the appended claims.

Having described my invention, what I claim and desire to secure by Letters Patent of the United States is:—

1. In a vehicle of the character described, a body adapted for tilting movement to either side, a rotating shaft, closed track rails provided on opposite sides of said shaft, means for rotating the shaft, crank means provided on said shaft for rotation therewith, and link members having one end connected to said crank means, and their other ends connected to the body, whereby when the shaft is rotated in the desired direction it will cause a tilting of the body in that direction, and spaced rollers provided on said body adapted for riding in said closed track rails provided on opposite sides of the shaft.

2. In a vehicle of the character described, a body adapted for tilting movement to either side, a rotating shaft, track rails, means for rotating said shaft, crank means provided on said shaft for rotation therewith, and link members having one end connected to said crank means, and their other ends connected to the body along the central longitudinal axis thereof, whereby when the shaft is rotated in the desired direction it will cause a tilting of the body in that direction, and spaced rollers provided on said body on oppositely disposed sides thereof adapted for engagement within said track rails, said track rails comprising a pair of oppositely disposed closed loops, having means provided intermediate their ends for permitting the entrance of said rollers within said loops.

3. In a vehicle of the character described, a body adapted for tilting movement to either side, a rotating shaft, track rails, means for rotating said shaft, means connecting said shaft with said body whereby rotary movement of the shaft will cause a tilting movement of the body, and track rails for guiding said body while being tilted, and spaced rollers provided on said body on oppositely disposed sides thereof adapted for engagement within said track rails, said track rails comprising a pair of oppositely disposed closed loops, having means provided intermediate their ends for permitting the entrance of said rollers within said loops.

4. In a vehicle of the character described, a body adapted for tilting movement to either side, a rotating shaft having gears provided thereon for rotating the shaft, track rails, means for rotating the shaft, and link members having one end connected to the gears away from the center thereof to produce a crank arm effect, and their other ends connected to the body along the central longitudinal axis thereof, whereby when the shaft is rotated in the desired direction it will cause a tilting of the body in that direction, said body having spaced rollers provided on opposite sides thereof, said rollers being adapted for riding within said track rails provided on opposite sides of the shaft formed in a closed loop with the intermediate portion of the upper wall thereof broken away to permit the entrance of said rollers within said rails.

5. In a vehicle of the character described, a frame, a shaft journaled on the intermediate portion of the frame and provided with crank means, a dump body having spaced rollers for riding on the frame at opposite sides of the shaft, track rails, means for rotating the shaft, and link members connected at one end to the crank means and having their other ends connected to the body along the central longitudinal axis thereof, whereby the rotation of the shaft in one direction will cause a tilting of the body in the same direction, said body having spaced rollers provided on opposite sides thereof, said rollers being adapted for riding within said track rails provided on opposite sides of the shaft formed in a closed loop with the intermediate portion of the upper wall thereof broken away to permit the entrance of said rollers within said rails.

6. In a vehicle of the character described, a frame, a shaft journaled on the intermediate portion of the frame and provided with crank means in the form of gears adapted for rotation with the shaft, track rails provided on opposite sides of the shaft, a dump body having spaced rollers for riding on said track rails, means for rotating the shaft, and link members connected at one end to said gears away from the center thereof, and having their other ends connected by a pin and slot connection to the underside of the body along the central longitudinal axis thereof, whereby the rotation of the shaft in one direction will cause a tilting of the body in the same direction.

7. In a vehicle of the character described, a frame, a shaft journaled on the intermediate portion of the frame and having crank means provided thereon, means for rotating said shaft, a double track rail provided on said frame, a dump body having rollers for riding in said track rails for guiding the body while being raised and moved sidewise, and link members having one end secured to the crank means and the other ends of said link members being connected by a slot and pin connection to the body, whereby when the shaft is rotated in one direction it will cause a tilting of the body in the same direction.

8. In a vehicle of the character described, a body adapted for tilting movement to either side, a rotatable shaft having crank means provided thereon, means for rotating the shaft, link members connecting said shaft with said body whereby rotary movement of the shaft will cause a tilting of the body, closed track rails for guiding the body in its tilting movement in both directions, and adjustable plate members associated with said track rails for adjusting the angle to which the body may be tilted.

9. In a vehicle of the character described, a body adapted for tilting movement to either side, a rotatable shaft having gears provided thereon, means for rotating the shaft, and link members having one end connected to said gears away from the center thereof, and their other ends being connected by a slot and pin connection to the body along the central longitudinal axis thereof, said link members being adapted when the body is in its normal horizontal position to assume a position that will cause them to exert a downward pull on the body to hold the same against vertical vibration and tilting, and when the shaft is rotated in the desired direction to act on said body to tilt the same in that direction.

10. In a vehicle of the character described, a frame having closed track loops longitudinally spaced from each other and inclining downwardly from the center of the frame towards the sides thereof, a shaft journaled on the frame midway the sides of the frame and provided with longitudinally spaced gears, a dump body having rollers adapted to ride and be guided in said track loops, said body being adapted to tilt in opposite directions about either roller acting as a fulcrum, a pair of link members having one end connected to one of the gears away from the center, and their opposite ends slidably connected to the body along the central longitudinal axis thereof, and means for rotating the shaft in reverse directions.

In witness whereof, I affix my signature.

HARVEY J. MILLER.